(12) United States Patent
Fulton

(10) Patent No.: US 7,277,241 B1
(45) Date of Patent: Oct. 2, 2007

(54) MACHINE FOR OPTICAL ASSISTANCE IN READING CHECKS

(76) Inventor: Robert Lyman Fulton, 2125 Eileen Dr., Pleasanton, CA (US) 94588

( * ) Notice: Subject to any disclaimer, the term of this patent is extended or adjusted under 35 U.S.C. 154(b) by 271 days.

(21) Appl. No.: 11/187,413

(22) Filed: Jul. 22, 2005

(51) Int. Cl.
G02B 27/02 (2006.01)
G02B 3/00 (2006.01)
A47B 19/00 (2006.01)
F21V 33/00 (2006.01)
F21V 7/00 (2006.01)
B42D 3/00 (2006.01)

(52) U.S. Cl. .................. 359/805; 359/801; 359/802; 359/807; 359/809; 362/98; 362/109; 362/154; 362/298; 281/31

(58) Field of Classification Search ........ 359/799–811, 359/817, 440, 441; 362/98, 109, 137, 139, 362/141, 143, 144, 298, 300, 154; 368/10, 368/67, 278; 379/433.11–433.13; 281/31, 281/34, 44; 40/364, 365, 563; 116/236, 116/323; 402/69
See application file for complete search history.

(56) References Cited

U.S. PATENT DOCUMENTS

| | | | |
|---|---|---|---|
| 1,567,643 A | 12/1925 | Hearne | |
| 2,503,550 A * | 4/1950 | Good | 40/563 |
| 3,140,883 A | 7/1964 | Anthony | |
| 5,113,327 A * | 5/1992 | Levy | 362/157 |
| 5,351,424 A * | 10/1994 | Schulle et al. | 38/102.1 |
| 5,575,556 A * | 11/1996 | Kennedy | 362/109 |
| 5,610,770 A | 3/1997 | Galiani | |
| 5,697,594 A * | 12/1997 | Adams et al. | 248/442.2 |
| 5,813,748 A | 9/1998 | Maxymych | |
| 6,023,377 A | 2/2000 | Slager | |
| 6,249,390 B1 | 6/2001 | Thibodeaux, Jr. | |
| 6,480,441 B1 * | 11/2002 | McKay | 368/10 |
| 6,621,629 B2 | 9/2003 | Blumenthal et al. | |
| 6,808,208 B2 | 10/2004 | Ward | |
| 6,950,374 B2 * | 9/2005 | McKay | 368/10 |
| 6,985,311 B2 * | 1/2006 | Bartone | 359/802 |
| 6,989,948 B2 * | 1/2006 | Hussaini et al. | 359/809 |
| 7,090,378 B1 * | 8/2006 | Zadro | 362/298 |
| 7,097,320 B2 * | 8/2006 | Cleveland | 362/190 |

FOREIGN PATENT DOCUMENTS

JP 2000-333800 5/2000

* cited by examiner

*Primary Examiner*—Loha Ben
(74) *Attorney, Agent, or Firm*—David P. Winters

(57) ABSTRACT

A machine for magnifying a check with a freshnel lens, a front cover and back cover hingably connected, to hold a credit card bill or restaurant check, to hold a credit card, to hold a writing utensil, and to illuminate the credit card bill or restaurant check.

14 Claims, 3 Drawing Sheets

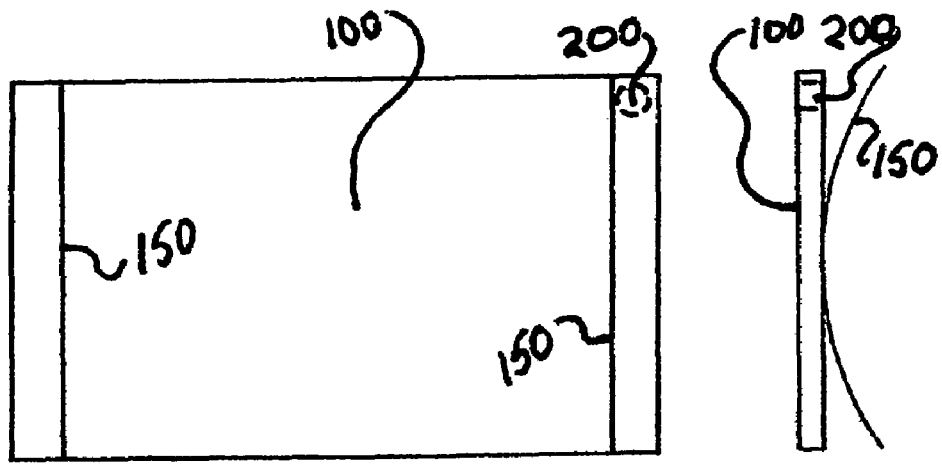
Fig. 1
Fig. 3
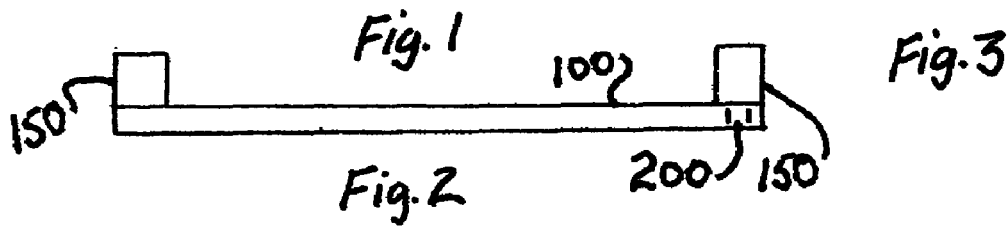
Fig. 2
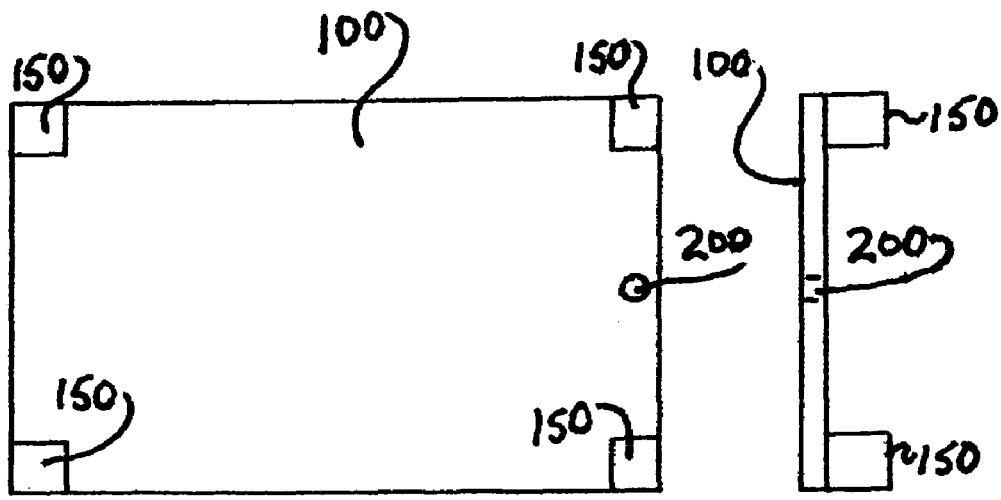
Fig. 4
Fig. 6
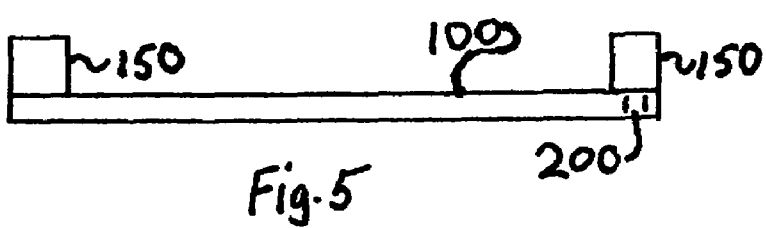
Fig. 5

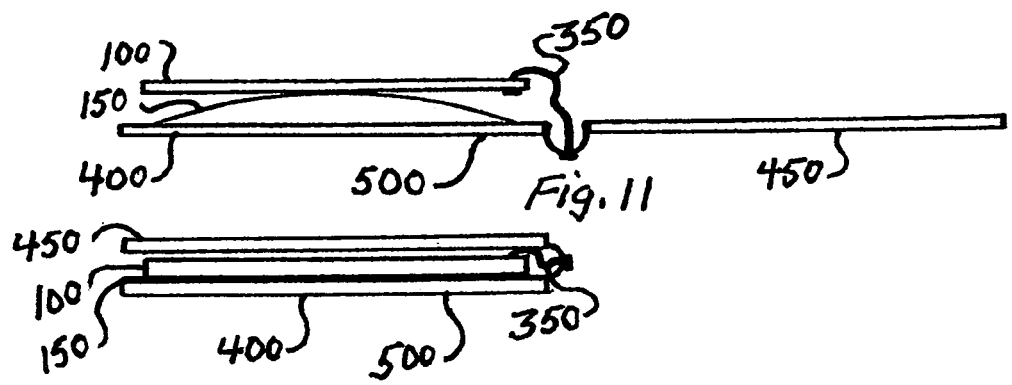
Fig. 11
Fig. 12
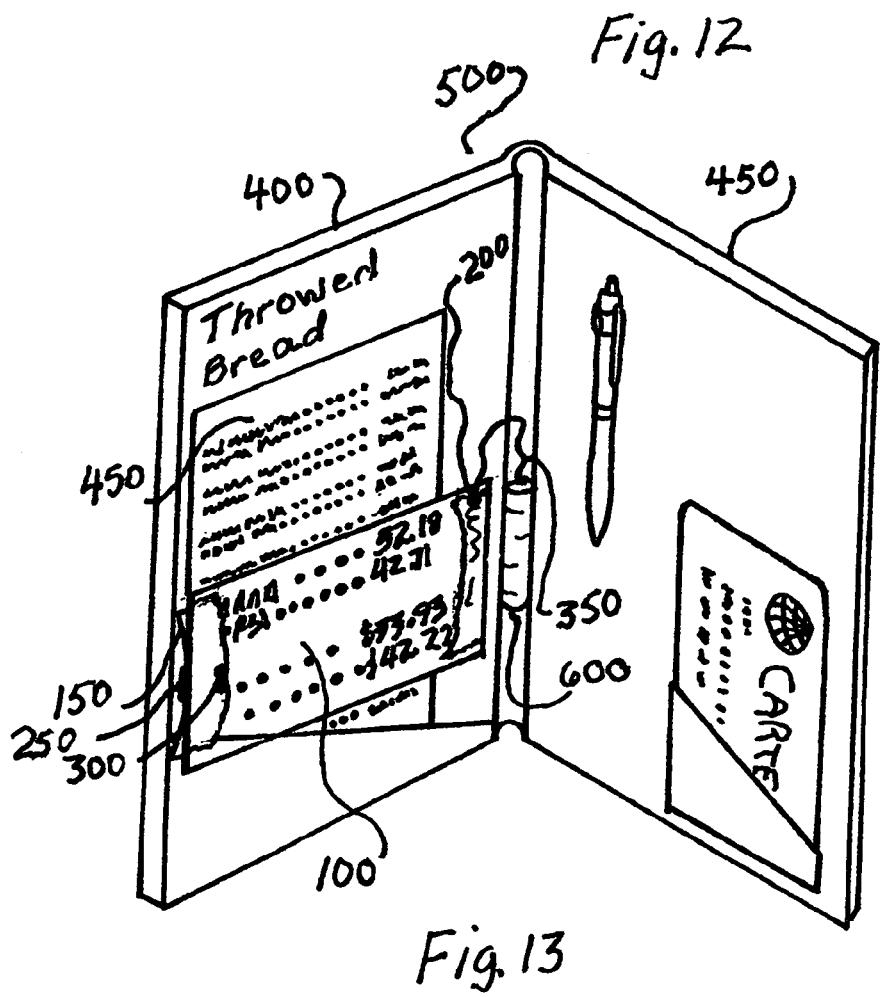
Fig. 13

MACHINE FOR OPTICAL ASSISTANCE IN READING CHECKS

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of optical magnification and more specifically to a machine for magnifying a check.

The necessity for patrons of various business establishments to be able to read the bills presented to them for goods and services rendered is well understood to be a necessity. Furthermore, it is well known that in some businesses such as restaurants or bars, the environment may not be conducive to easily reading a text, especially if said text is small and/or not clearly printed. Said environment may be darkened for reasons of ambience, for example. Also, many patrons are not able to read printed matter in close proximity without the aid of spectacles.

In addition, those familiar with businesses that cater to the general public are well aware that the goodwill of customers is an important business asset. Therefore, any means that can increase convenience to said customers is to be desired, especially any means that will not detract from a good mood when they must part with money at the time of settlement of accounts. Thus, the present invention, which will make it possible to read a bill or check regardless of the lighting conditions and without having to find and put on spectacles, is needed.

U.S. Pat. No. 6,621,629 B2 by Blumenthal et al discloses a flexible sidewall supporting a magnifying lens, for use in reading a bottle or vial label, the sidewall having curvature such that it tends to easily wrap around any small annular container to magnify the label.

U.S. Pat. No. 3,140,883 by Anthony teaches a sleeve type device for reading telephone books configured to enclose the covers and spine of a book, the device having, attached, a magnifying lens on a flexible ribbon that bends in one plane.

U.S. Pat. No. 5,813,748 by Maxymych discloses a transaction tray for illuminating, but not magnifying, documents, comprising a tray portion and a hinged lid portion with means to illuminate the tray portion.

U.S. Pat. No. 6,023,377 by Slager teaches an apparatus to unfold, support and magnify indicia from above a user's hand while the user is writing on a planar sheet, said apparatus being collapsible into a moisture resistant unit.

U.S. Pat. No. 6,249,390 B1 by Thibodeaux, Jr. discloses a magnifying lens with a mount, hole-punched and configured to be inserted into a notebook binder.

Patent Abstract of Japan 200-333800 discloses a box for display of emblems or other such memorabilia and having a lid comprising a transparent magnifying lens portion.

U.S. Pat. No. 5,610,770 by Galiani teaches a magnification system for booklets comprising a freshnel lens mounted on two pivoting arms, pivotable and linearly movable.

U.S. Pat. No. 1,567,643 by Hearne discloses a foldable device to hold order pads, menus, and writing implements. It comprises no magnification capability.

U.S. Pat. No. 6,808,208 B2 by Ward teaches a food/drink tab/check holder in the form of a foldable booklet having magnification and illumination means affixed to a sliding arm, rigidly configured to display a single level of magnification.

In substantial contrast to the present disclosure, the Blumenthal, U.S. Pat. No. 6,621,629 B1, art teaches a side walled device that naturally curves around a container, not a flat magnifier of adjustable distance. In further contrast to the instant art, Blumenthal teaches no illumination means nor any lens distance-biased means of focal adjustment for adjusting magnifier distance.

In contrast to Anthony, U.S. Pat. No. 3,140,883, the instant disclosure teaches a biased means of adjusting height of the magnifier and illumination means, a capability not found in Anthony. In additional contrast to the instant art, Anthony teaches a structure much more complex and, thus, more expensive to manufacture and assemble.

In contrast to the instant, art Maxymych, U.S. Pat. No. 5,813,748 comprises no means to magnify text on a planar surface, but teaches a structure much more complex and thus more expensive to manufacture and assemble.

In substantial contrast to the instant art, Slager, U.S. Pat. No. 6,023,377 teaches a component with hinges on opposing edges supporting members such that when the Slager taught device is in operative configuration, said device comprises a U-shape. In further contrast to Slager, the instant art teaches a biased means of adjusting magnifier distance and an illumination means for the indicia to be magnified. The instant art also teaches a configuration much more simple in design and construction such that the instant art is more easily and cheaply fabricated and assembled.

In contrast to Thibodeaux, Jr, U.S. Pat. No. 6,249,390 B1, the instant art teaches a movable biased means of adjusting magnifier distance for the magnifying means and illumination means for the material to be examined. In further contrast to the instant art, Thibodeaux, Jr. teaches a magnifying insert for a binder, said magnifying insert having at least one edge configured to fit on binder rings or pegs. The instant art teaches no such limitation.

Patent abstract of Japan, 200-333800 teaches a memorabilia display having a transparent cover comprising magnifying means for the contents of the receptacle but, unlike the instant art, having no means to illuminate said contents. In further contrast, the instant art is configured to lie flat on a folder or book so that the illuminated and magnified material is visible only after opening the folder or book, a capability not held by abstract 200-333800.

In contrast to the instant art, Galiani, U.S. Pat. No. 5,610,770 teaches a mechanical support for a lens that is much more complex and thus more expensive to manufacture and assemble than the instant art. Galiani teaches no biased means of adjusting magnifier distance for the magnification means nor a means of illumination.

Hearne, U.S. Pat. No. 1,547,643, in substantial contrast to the instant art, teaches no means for magnification nor for illumination.

In contrast to Ward, U.S. Pat. No. 6,808,208 B2, the instant art requires no slots to receive flanges or other components of a magnifying means in order to have viewing access to the full document. The Ward taught magnification means is not movable from one surface to another. In further contrast to Ward, the instant disclosed illumination means is discretely transmitted by the magnification means so that the efficacy of the illumination of the magnified surface is not dependent on the relative positions of the book covers. Thus, the instant illumination means is effective if the book is opened and laid flat, for example.

BRIEF SUMMARY OF THE INVENTION

The primary object of the invention is to allow people to easily read fine print on restaurant checks and credit card bills without spectacles.

Another object of the invention is to allow the concealment of a restaurant check or credit card bill.

Another object is to magnify and illuminate the visual image of a document resting on a planar surface of the device.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for magnifying and illuminating a check comprising: a freshnel lens, a front cover and back cover hingably connected, means to hold a credit card bill or restaurant check, means to hold a credit card, means to hold a writing utensil, and biased means to vary the distance of the magnifier above the check surface.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a top perspective view of the invention.

FIG. 2 is a front perspective view of the invention.

FIG. 3 is a side perspective view of the invention.

FIG. 4 is a top perspective view of an alternate embodiment of the invention.

FIG. 5 is a front perspective view of an alternate embodiment of the invention.

FIG. 6 is a side perspective view of an alternate embodiment of the invention.

FIG. 11 is a side perspective view of the instant disclosure in communication with an open, foldable, check holder.

FIG. 12 is a side perspective view of the instant disclosure in communication with a closed, foldable, check holder.

FIG. 13 is a front view of the present disclosure communicating with a foldable check holder.

LIST OF COMPONENTS

Figure 7:
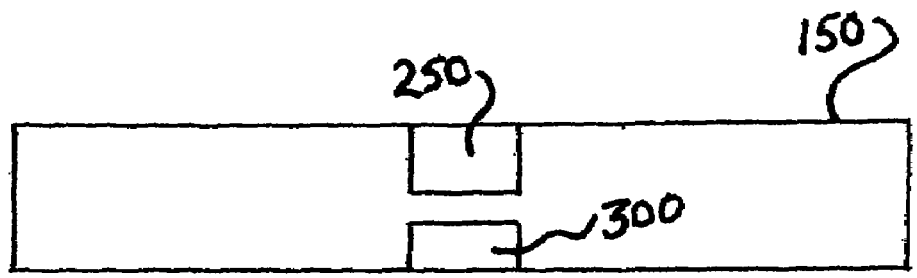
FIG. 7 is a top perspective view of an embodiment of a biased means of adjusting magnifier distance expanded.

100 Fresnel lens
150 Biased means of adjusting magnifier distance
200 Tether hole
250 Power source
300 Light source
350 Tether
400 Front cover of foldable check holder
450 Back cover of foldable check holder
500 Foldable check holder
550 Check
600 Alternative power source

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Turning to FIG. 1, FIG. 2, FIG. 3, FIG. 11, and FIG. 12, we see a magnification device comprising a fresnel lens (100), a biased means of adjusting magnifier distance (150) and a tether hole (200). We see further that said biased means of adjusting magnifier distance comprises curvilinear strips having widths substantially less than the width of the fresnel lens (100).

Therefore, we can understand that the instant device can be made to communicate with foldable tab or check holder (500) having a front cover (400) and, a back cover (450), with the inside surfaces of said covers comprising means to hold credit cards, checks, (550) statements, and other accouterments useful and necessary to facilitate the settling of accounts after goods and services have been rendered and/or consumed.

By judicious adjustment of the tether (350) in the tether hole (200), securing the lens (100) to said tab or check holder (500) in such manner that the length of the tether (350) is short enough to keep the instant lens within the dimensions of said tab or check holder (500) but long enough to allow positioning the instant device, the fresnel lens (100) may be positioned to affect magnification of substantially all said inner surfaces of said check holder (500).

Looking further at FIG. 11, FIG. 12, and FIG. 13, we see that the means of adjusting magnifier distance (150) is biased to locate the freshnel lens (100) in a position above the inside surface of the front cover (400) of a foldable check holder (500) over the associated check (550). Thus, a patron looking down through the fresnel lens (100) will see a magnified image of the check (550).

Also, we see that when the foldable check holder (500) is closed, the biased means of adjusting magnifier distance (150) is overcome by the weight of the front cover (400) or back cover (450), so that the fresnel lens (100) may lie flat against the inside surfaces of the front cover (400) and the back cover (450) of the foldable check holder (500) so that the check holder (500) may close completely.

Further, we understand that when the foldable check holder (500) is opened, the biased means of adjusting magnifier distance (150) will return the fresnel lens (100) to a useful position above the surface of the inside surface of the front cover (400). We also understand that should any text or item be located contiguous to the inside surface of the back cover (450) the fresnel lens may be simply transferred from its position on the inside surface of the front cover (400) to a position on the inside surface of the back cover (450).

Figure 8:
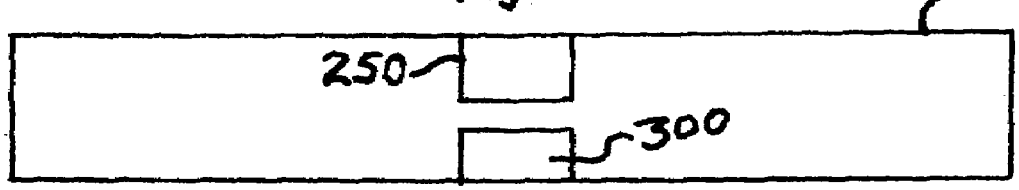
FIG. 8 is a top perspective view of an embodiment of the biased means of adjusting magnifier distance of FIG. 7, compressed.
Figure 9:
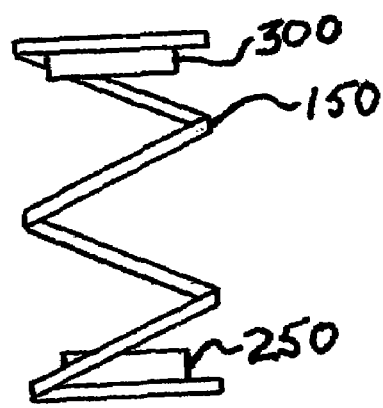
FIG. 9 is a side perspective view of an alternate embodiment of a biased means of adjusting magnifier distance, uncompressed.
Figure 10:
FIG. 10 is a side perspective view of the biased means of adjusting magnifier distance embodiment of FIG. 9, compressed.

Looking now at FIG. 4, FIG. 5, FIG. 6, FIG. 7, FIG. 8, FIG. 9, and FIG. 10, we see that in alternate embodiments, the biased means of adjusting magnifier distance (150) may comprise resilient material, curvilinear springs, or helical springs, and we understand that additional biased means of adjusting magnifier distance well known to those well versed in the art may be comprised as well. We further see that the biased means of adjusting magnifier distance (150) may, also, comprise light emitting means (300) and power source (250) for said light emitting means.

We note that said lighting emitting means (300) and said power source (250) may be connected by circuitry comprising a switch that will be closed when the biased means of adjusting magnifier distance (150) is in its biased position, and open when the bias means (150) is overcome by closing the check holder (550) so that in an embodiment of the instant art as shown in FIG. 11, FIG. 12, and FIG. 13, wherein the instant art communicates with a foldable check holder (500) as previously described, the light emitting means will emit light when the foldable check holder (500) is open and not emit light when the foldable check holder (500) is closed.

Thus, in an embodiment of the instant art wherein the biased means of adjusting magnifier distance (150) comprises the light emitting means (300) and wherein said instant art communicates with a foldable check holder (500) as in FIG. 11 and FIG. 12, we understand that when the foldable check holder (500) is opened, any text or object under the fresnel lens will be magnified and illuminated so that anyone, even those with somewhat less than acute eyesight may more easily peruse said text or object.

We can see that the power source may be a battery or cell, and that said battery or cell may be rechargeable and may be recharged by various means well known by those well versed in the art of recharging batteries or cells including but not limited to a dynamo powered by motion of the associated device, made to communicate with the instant art. We can also see that the light emitting source may be an incandescent light bulb, a fluorescent light bulb, a light emitting diode, or other light emitting device known to those versed in the art.

Also in FIG. 12, we see, illustrated, an alternative power source (600) located in the body of the check holder (500), the tether (350), then, also being used as a means of transmitting energy from the power source (600) to the light source (300).

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A machine for magnifying a check comprising:
   a lens;
   a biased means of adjusting magnifier distance for said lens, said biased means of adjusting magnifier distance comprising an illumination means;
   a power source for the illumination means; and
   a means to movably connect the lens to another structure.

2. A machine as in claim 1 wherein the lens is a fresnel lens.

3. A machine as in claim 1 wherein the biased means of adjusting magnifier distance is a curvilinear spring.

4. A machine as in claim 1 wherein the biased means of adjusting magnifier distance is a compressible, resilient, flexible material.

5. A machine as in claim 1 wherein the illumination means is an incandescent light bulb.

6. A machine as in claim 1 wherein the illumination means is a fluorescent light bulb.

7. A machine as in claim 1 wherein the illumination means is a light emitting diode.

8. A machine as in claim 1 wherein the power source is a dry cell.

9. A machine as in claim 1 wherein the power source is a rechargeable electric cell.

10. A machine as in claim 1 wherein the power source is a rechargeable electric cell, replenished by a dynamo powered by motion of the overall structure.

11. A machine as in claim 1 wherein the means to connect the lens to another structure is a tether.

12. A machine as in claim 1 wherein the means to connect the lens to another structure is a hinge.

13. A machine as in claim 1 wherein the means to connect the lens to another structure is also a means of transmitting energy to the means of illumination.

14. A machine as in claim 1 wherein the power source is contained in the body of another associated structure, essentially a check folder.

* * * * *